US010646069B2

(12) United States Patent
Bonaccorso

(10) Patent No.: US 10,646,069 B2
(45) Date of Patent: May 12, 2020

(54) INSERT FOR AN AIR-BASED FRYER, APPARATUS COMPRISING SUCH INSERT

(71) Applicant: KONINKLIJKE PHILIPS N.V., Eindhoven (NL)

(72) Inventor: Davide Bonaccorso, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 428 days.

(21) Appl. No.: 15/518,270

(22) PCT Filed: Oct. 9, 2015

(86) PCT No.: PCT/EP2015/073371
§ 371 (c)(1),
(2) Date: Apr. 11, 2017

(87) PCT Pub. No.: WO2016/058920
PCT Pub. Date: Apr. 21, 2016

(65) Prior Publication Data
US 2017/0303740 A1    Oct. 26, 2017

(30) Foreign Application Priority Data
Oct. 15, 2014    (EP) ..................................... 14189008

(51) Int. Cl.
*A47J 37/06*    (2006.01)
(52) U.S. Cl.
CPC ....... *A47J 37/0641* (2013.01); *A47J 37/0664* (2013.01); *A47J 37/06* (2013.01)
(58) Field of Classification Search
CPC .... A47J 37/06; A47J 37/0641; A47J 37/0664; A47J 39/003; A47J 36/027; A47J 43/18;
(Continued)

(56) References Cited

U.S. PATENT DOCUMENTS

| | | | | |
|---|---|---|---|---|
| 5,481,962 A | * | 1/1996 | Tedesco | A47J 37/0623 126/21 A |
| 2008/0105135 A1 | * | 5/2008 | McFadden | A21B 1/00 99/330 |

(Continued)

FOREIGN PATENT DOCUMENTS

| | | |
|---|---|---|
| CN | 102613911 A | 8/2012 |
| CN | 202537261 U | 11/2012 |

(Continued)

OTHER PUBLICATIONS

CN202589327—English Translation (Year: 2012).*

(Continued)

*Primary Examiner* — Tu B Hoang
*Assistant Examiner* — Tiffany T Tran

(57) ABSTRACT

The invention relates to an insert (10) for an apparatus (100) for preparing food by circulation of a flow of hot air in a food basket (14) placed inside a food preparation chamber and having a bottom part (108) with a lower opening area (26) for the circulation of the flow of hot air. The insert comprises an upper surface (12) intended to be arranged below the food basket. The upper surface (12) defines an inclined surface (16) having a downward inclination extending outwards from a middle zone towards a perimeter of the insert. The inclined surface (16) is provided such that the inclination extends at least beyond a vertical projection of the lower opening area (26). The insert further comprises spacers (40) provided on a lower side (42) of the insert to create a clearance gap (44) between the lower side (42) and a bottom surface (46) of the food preparation chamber. This invention allows improving food preparation while minimizing the emission of cooking oil fumes.

16 Claims, 5 Drawing Sheets

(58) Field of Classification Search
CPC ........ A47J 37/0694; A21B 1/00; A21B 1/245; A21B 1/36; H05B 6/6473; H05B 6/6485; H05B 6/6408; Y10S 99/14; F24C 15/16
USPC ...... 126/21 A; 219/400, 681, 732, 734, 762; 99/330, 339, 447, 474, 476, 421 H, 444, 99/446, 448, 449, 450, DIG. 14
See application file for complete search history.

(56) References Cited

U.S. PATENT DOCUMENTS

| | | | | |
|---|---|---|---|---|
| 2008/0163764 | A1* | 7/2008 | Payen | A47J 37/043 99/447 |
| 2009/0134140 | A1* | 5/2009 | Van Der Weij | F24C 15/322 219/400 |
| 2011/0120319 | A1* | 5/2011 | Chang | A47J 37/0623 99/409 |
| 2014/0083992 | A1* | 3/2014 | Linnewiel | A47J 37/0641 219/400 |

FOREIGN PATENT DOCUMENTS

| | | |
|---|---|---|
| CN | 202589327 U | 12/2012 |
| CN | 202739777 U | 2/2013 |
| CN | 203041954 U | 7/2013 |
| CN | 203234613 U | 10/2013 |
| CN | 203776727 U | 8/2014 |
| KR | 101253705 B1 | 4/2013 |

OTHER PUBLICATIONS

CN203041954 English Translation (Year: 2012).*
CN203234613 English Translation (Year: 2013).*
CN203776727 English Translation (Year: 2014).*
Original CN202589327 (Year: 2012).*
Original CN203041954 (Year: 2012).*

* cited by examiner

INSERT FOR AN AIR-BASED FRYER, APPARATUS COMPRISING SUCH INSERT

This application is the U.S. National Phase application under 35 U.S.C. § 371 of International Application No. PCT/EP2015/073371, filed on Oct. 9, 2015, which claims the benefit of International Application No. 14189008.7 filed on Oct. 15, 2014. These applications are hereby incorporated by reference herein.

FIELD OF THE INVENTION

The present invention relates to preparing food by circulation of hot air, and relates in particular to an insert for an apparatus for preparing food by circulation of hot air in a food basket placed in a food preparation chamber and to an apparatus for preparing food by circulation of hot air.

BACKGROUND OF THE INVENTION

For cooking food, air-based fryers are known, for example for cooking fries or chicken, wherein the heat for preparing the food is provided by hot air. In order to heat the provided food for the preparation and cooking thereof, a stream of hot air or a flow of hot air is generated that passes the food placed in a food preparation chamber. These appliances are usable in the household environment. It has been shown that generation of fume occurs during the food preparation procedure, i.e. the cooking procedure, because fat particles get burnt by hot air, or via contact with hot parts of the appliance. However, it is desired that the fumes be reduced to a minimum, for example for hygiene or health concerns, or considering odours and user friendliness. One solution to reduce the generation of fume is to decrease the temperature of the hot air circulating inside the apparatus to a temperature point where fat particles do not get burnt. However, this solution does not apply for all food preparations, as some food preparations still require high temperatures to cook ingredients, for example in a range of approximately 160° C. to 200° C., and in this temperature range cooking fumes will be generated.

Patents published under numbers CN203776727U, CN203776729U, KR101253705B1, US20080163764A1 disclose air-based fryers for preparing food by circulation of a flow of hot air in a food basket.

OBJECT AND SUMMARY OF THE INVENTION

It is an object of the invention to propose an insert for an apparatus for preparing food by circulation of hot air, as well as an apparatus implementing this insert, that reduces fume generation.

The invention is defined by the independent claims. The dependent claims define advantageous embodiments.

According to a first aspect of the present invention, an insert for an apparatus for preparing food by circulation of hot air in a food basket placed in a food preparation chamber is provided. The insert comprises an upper surface that is intended to be arranged below the food basket. The upper surface defines an inclined surface having a downward inclination extending outwards from a middle zone towards a perimeter of the insert. The inclined surface is provided such that the inclination extends at least beyond a vertical projection of a lower opening area of the food basket. The lower opening area comprises a plurality of openings for circulation of hot air.

As an advantage, the extension of the inclination provides that moisture, for example fat or water, that drips from the food, for example after the start of the cooking process, will not accumulate on the bottom part underneath the food basket. On the contrary, those liquid or other residuals will be directed to side portions away from the region below the food basket. Thus, it is prevented that if the temperature of the bottom part is higher than 100° C., the accumulated liquid that would start boiling would lead to an ejection of some liquid or fat particles in a vertical direction towards the heater placed in the upper part of the chamber. Thus, this aspect of the invention allows the amount of fat that will burn upon contact with the heater, and hence produce smoke, to be reduced. Moreover, the clearance gap allows collecting the excess of those liquid or other residuals underneath the insert, and preventing them from re-evaporation that would cause fumes when reaching a heating element used to heat the flow of hot air. This also contributes to reducing cooking fumes. Hence, higher temperatures for improved food preparation can be provided.

According to an example, the inclined surface is provided such that the inclination extends beyond a vertical projection of side walls of the food basket.

According to an example, the inclination continues in a downward direction.

In an example, one or more small steps are provided. In a further example, one or more circumferential slots are provided. For example, the insert is fixedly provided as a lower surface of an air guiding volume and the inclination extends downward and outward from the middle zone.

In an example, the inclination extends downward from a middle zone and towards an edge of the upper surface.

According to an example, the upper surface is provided as a conical structure.

According to an example, the upper surface comprises a plurality of openings adapted to receive upwardly extending ribs of an air guide member placed below the insert, i.e. ribs extending upwards.

According to an example, in addition to the inclination, the upper surface is provided with a plurality of upwardly extending ribs forming an air guide.

According to a second aspect of the present invention, an apparatus for preparing food by circulation of hot air is provided. The apparatus comprises a food preparation chamber and a food basket placed inside the food preparation chamber, wherein the food basket has side walls and a bottom part with a lower opening area comprising a plurality of openings for the circulation of hot air. Further, the apparatus comprises a system for generating a flow of hot air including heating means and ventilation means. Still further, the apparatus comprises air guide means to guide the flow of hot air towards the bottom part of the food basket. Still further, the apparatus comprises an insert according to one of the above-mentioned examples, which is placed below the bottom part. The inclined surface of the insert is provided with an inclination that extends at least beyond a vertical projection of the lower opening area.

According to an example, the insert is provided with a collecting portion at an outer edge of the inclined surface. The collecting portion is arranged at least outside the vertical projection of the lower opening area.

According to an example, the insert is freely detachable from the apparatus.

In another example, the insert is provided as an additional insert to upgrade an existing apparatus.

According to an aspect, the three-dimensional shape below a food basket in an apparatus for preparing food by hot air is provided such that fat or other liquid, for example water, that drips from food arranged in the food basket, will not be collected below the food basket, but will be transported to side portions away from the area directly below the food basket. For such transportation, an inclined surface is provided that slopes downward to the edge regions, i.e. that has an upper region more or less in the middle of the surface portion below the food basket. For example, a conical shape is provided to make oil droplets or water droplets flow to the circumferential edge regions. Thus, water or fat droplets that are ejected during a boiling procedure, when present on the surfaces with a high temperature due to the hot air stream passing these surfaces, will not be ejected in the direction of the heater, but will so to speak fly in an upward direction in a part of the volume where the walls have a lower temperature, for example. The conical bottom insert can be provided as an adapter that fits on top of any pre-existing surface in order to improve smoke prevention. When the insert is provided at a distance with respect to a supporting surface below said insert, a so-called "roof effect" can be achieved since a certain amount of moisture of fat is allowed to flow underneath the insert, i.e. underneath the adapter on the pre-existing pan surface, or an insert. The insert covering the liquid is a further improvement in mitigating smoke emissions. The basically conically shaped surface provided as smoke prevention can also be combined with air guide members that support the distribution of hot air inside the food basket in a preferably even manner. The air guide members arranged in a radial configuration or spiral configuration still allow surface portions to have a continuous inclination that extends downward from a middle zone towards the edge of the surface.

These and other aspects of the present invention will become apparent from and are elucidated with reference to the embodiments described hereinafter.

BRIEF DESCRIPTION OF THE DRAWINGS

Exemplary embodiments of the invention will be described in the following with reference to the following drawings.

DETAILED DESCRIPTION OF THE INVENTION

Figure 1A:
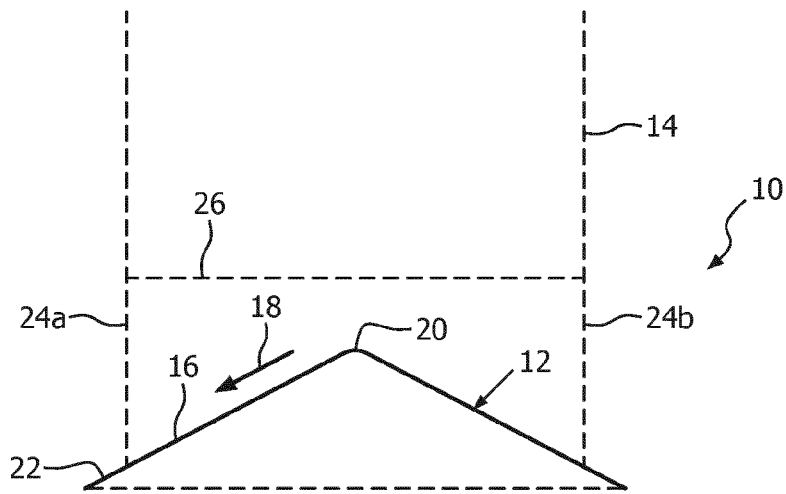
FIG. 1 shows a simplified example of an insert according to the invention in a schematic cross-section in FIG. 1A and in a schematic top view in FIG. 1B.
Figure 1B:
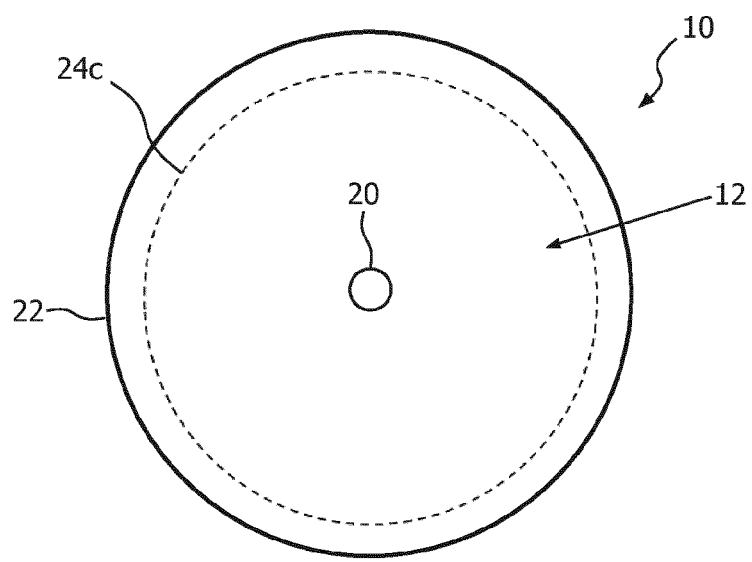

FIG. 1 shows an insert 10 for an apparatus for preparing food by circulation of a flow of hot air in a food basket placed inside a food preparation chamber and having a bottom part with a lower opening area 26 for the circulation of said flow of hot air, wherein FIG. 1A shows a schematic cross-section and FIG. 1B shows a schematic top view.

The insert 10 comprises an upper surface 12 that is intended to be arranged below a food basket 14 (schematically indicated with a dotted line structure). The upper surface 12 defines an inclined surface 16 with an inclination, indicated with arrow 18, that extends downward from a middle zone 20 in an outward direction towards a perimeter of the insert 10.

The term "perimeter" relates to a circumferential end or edge of the upper surface of the insert. The perimeter is where the insert ends from a point of view in the middle portion.

In an example, the inclination extends downward from the middle zone to an outward portion of the upper surface.

For example, the insert is integral with a housing and bottom structure of a food preparation chamber, and the insert has a transition portion where the insert and the adjacent bottom or wall portion are interconnected. The inclination then extends downward from the middle zone to such a transition zone.

In an example, the inclination extends downward from the middle zone to an edge of the insert.

In an example, the inclination continuously extends downward. For example, the inclination extends downward from the middle zone 20 toward an edge or edge zone 22 of the upper surface.

In an example, the inclination extends downward at a constant angle. In another example, not further shown, the inclination extends downward at a varying angle, such as the surface being flatter or steeper in the direction of the downward inclination.

The inclined surface 16 is provided such that the inclination extends at least beyond a vertical projection, indicated with two dotted projection lines 24a and 24b of the lower opening area 26 of the food basket, indicated with a dotted line 26 of the food basket.

The insert further comprises spacers 40 (shown on FIG. 3 and FIG. 6) provided on a lower side of the insert to create a clearance gap 44 between the lower side and a bottom surface of the food preparation chamber. This aspect of the invention will be further described in the following with reference to FIG. 3.

In FIG. 1B, the top view indicates that the inclined surface 16 extends beyond the vertical projection, which is indicated in FIG. 1B with a dotted line circle 24c.

It must be noted that the shape of the insert as well as the shape of the indicated food basket is shown in a circular manner as an example only. Other shapes could also be considered, such as rectangular or square shapes (viewed in a plan view), for example with rounded edge portions. Of course, other shapes are also provided, such as an octagonal shape or a triangular shape in the vertical projection direction.

It must be noted further that the food basket 14 is indicated only for explaining the relation between the extension of the inclination and the food basket itself.

In an example, the food basket is to be arranged above the insert such that the insert is arranged below the food preparation chamber, as indicated in FIG. 1A.

The term "intended" refers to the insert comprising the upper surface that is adapted and configured to be arranged below the food basket placed in the food preparation chamber.

The insert may also be referred to as a "bottom insert" due to the arrangement of the insert on a bottom, or bottom part or bottom region, of the food preparation chamber. The food preparation chamber may also be referred to as a volume, enclosure or container for circulation of hot air, in which volume the food basket is provided.

The upper surface may also be referred to as a "plate-like base structure".

The circulation of the hot air is also referred to as a "through-flow" of hot air, since the air is passing through the food basket.

The insert is provided as a plate-like structure with a raised portion in the centre or middle region, which inclines to the edges in a downward direction.

The term "continuous downward inclination" relates to an inclined surface having a continuous downward inclination, e.g. having a constant inclination angle. However, the term "continuous downward inclination " also relates to a surface with different portions having different degrees of inclination, such as a stepped or differently shaped surface. As a general aspect, the inclined surface is provided such that liquid dripping on the upper surface is drained off the upper surface towards the edge.

The "lower opening area" is also referred to as "opening area" or "bottom part of the food basket" having holes for air circulation. The lower opening area may be provided as a plurality of holes in a bottom surface of the food basket. The lower opening area may also be provided as a mesh-like structure, or grid-like structure, providing support for the food to be prepared, on the one hand, and allowing the flow of hot air to stream through the resulting openings, on the other hand.

In an example, the insert is detachable. The insert is provided as an additional adapter for upgrading an existing food preparation apparatus.

In another example, the insert is fixedly provided as a lower surface of an air guiding volume.

In an example, the upper surface is inclined in at least two opposing directions.

In a further example, the upper surface is inclined in a circumferential manner. For example, the inclination is provided as a point-like symmetry.

The sloping surface is also referred to as inclined surface, or tapered surface that tapers downwards to the circumferential edge.

In an example, the upper surface is provided with a continuous inclination except for a centre point.

The term "extends beyond" means that the upper surface area below the lower opening area is completely covered with the inclined surface, and, starting from a central region below the opening area, the inclination also covers a portion that extends outside the projected area. Thus, the inclination covers a region that is larger than the vertical projection.

The term "vertical" relates to a vertical arrangement during normal operation of the apparatus.

In an example, the inclination is provided to extend to the edge, or edge zones, of the upper surface, i.e. the inclination is terminated or surrounded by the edge. In other words, the inclination forms the edge zone of the insert.

In another example, the inclination is provided to extend as far as a circumferential zone that is provided as a surrounding frame zone. For example, the circumferential zone is provided as a fat collection volume, e.g. as a collection brim.

In a still further example, the inclination is provided to extend as far as a transition zone, which transition zone is followed by a wall portion enclosing the volume for circulation of the hot air, i.e. the transition zone is followed by a side-wall portion of the food preparation chamber.

In general, the inclination is provided to extend at least beyond a vertical projection of the lower opening area, in which area fat may drip down from the food basket. Hence, the inclination is provided to ensure that dripping fat or oil, or also other dropped particles or debris, are not collected below the food preparation area at least in the region where the openings for the hot air circulation are provided. The inclination thus provides a collecting space to the side of the opening area.

Figure 2A:
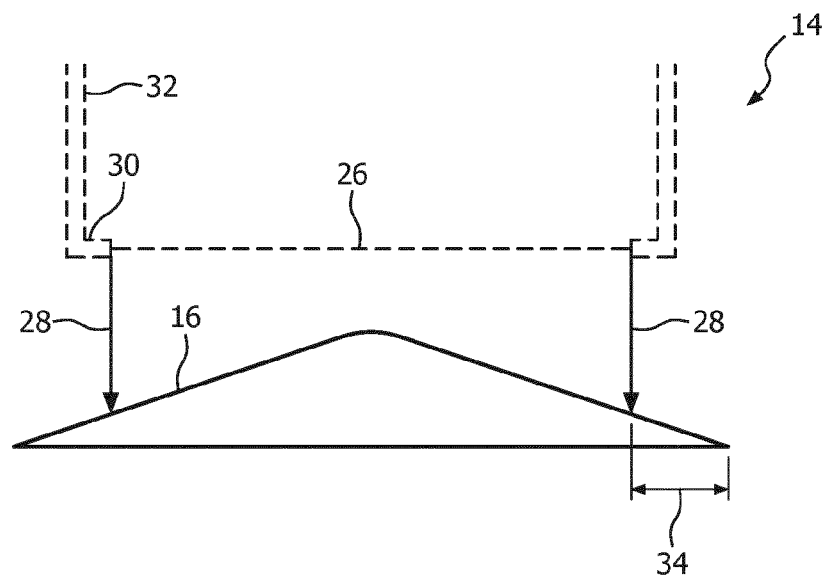
FIG. 2 shows a cross-section through an insert in a first example in FIG. 2A and in a second example in FIG. 2B.

FIG. 2A shows a further example, where the inclined surface 16 is provided such that the inclination extends beyond a vertical projection, indicated with projection arrows 28 of the contour of the lower opening area 26. For example, a frame portion 30 having a closed surface is provided in a circumferential manner to connect the opening area 26 with side-walls 32.

Figure 2B:
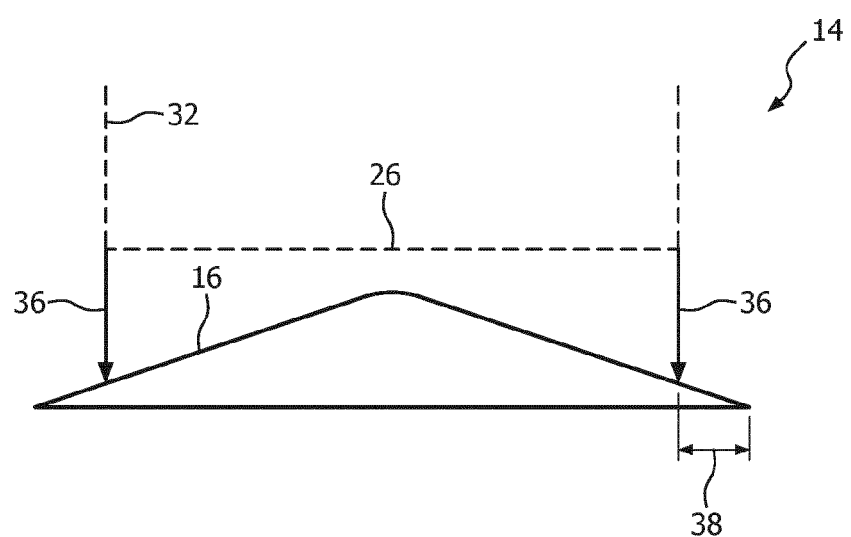

In FIG. 2A, a double arrow 34 indicates the amount of extension of the inclination beyond the vertical projection 28. FIG. 2B shows a further example, where the inclined surface 16 is provided such that the inclination extends beyond a vertical projection, indicated with projecting arrows 36 of the side walls 32 of the food basket 14.

In FIG. 2B, a further double arrow 38 indicates the amount of extension of the inclination beyond the vertical projection 36.

The inclination is thus provided in such a way that even if the lower or bottom part of the food basket is provided as the opening area, all material that drips or falls down onto the inclined surface is drained away from the upper surface towards the edge such that it is collected outside the projection of the side-walls.

As already indicated, in an example, the upper surface is provided as a conical structure. For example, the insert comprises a circular outer shape, or a square or rectangular shape, e.g. with rounded corner portions.

It must be noted that although the figures show examples of the insert where the inclined surface has an elevated portion in the middle region, this elevated portion can also be arranged differently, for example non-concentrically with the food basket 14.

Figure 3:
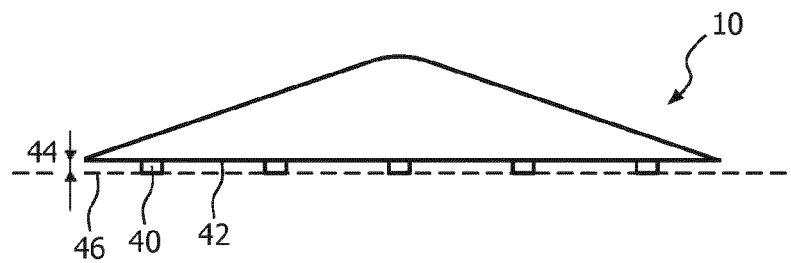
FIG. 3 shows a cross-section through a further example of an insert according to the invention, with spacers provided on a lower side to provide a clearance gap.

FIG. 3 shows the insert 10 according to the invention comprising spacers 40 that are provided on a lower side 42 of the insert 10 to provide a clearance gap 44 between the lower side 42 and a bottom surface (illustrated by a dashed line 46) of the food preparation chamber.

In an example, the clearance gap 44 also allows to collect excess drip water and/or oil underneath the insert and to prevent it from re-evaporation.

The spacers are provided as distance elements. The bottom surface of the volume may also be referred to as support surface of the container for the circulation of hot air.

Figure 4:
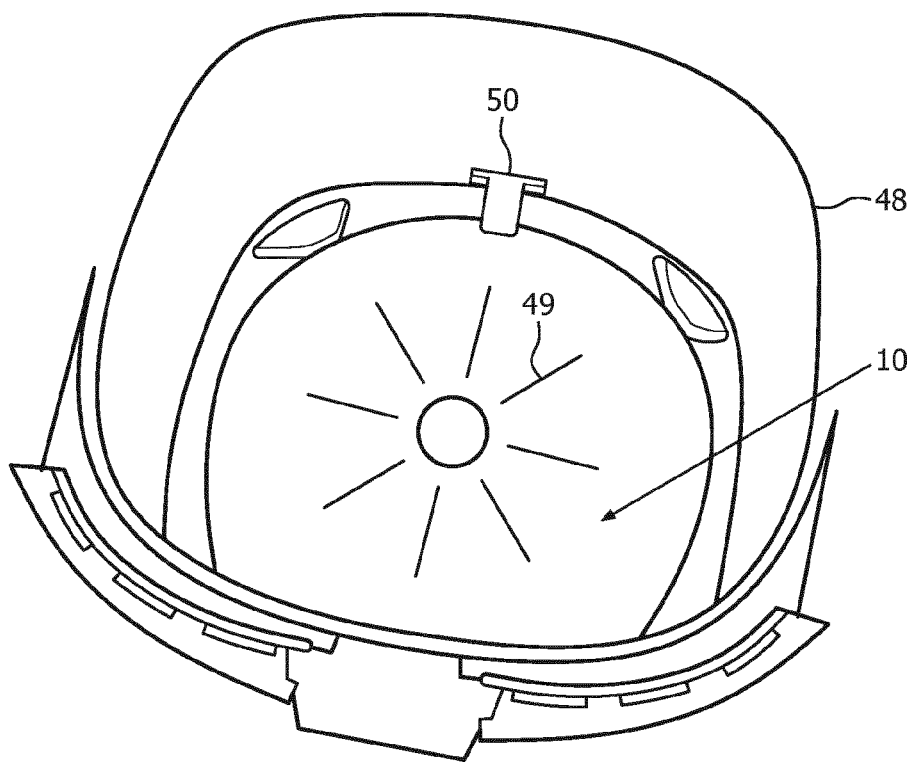
FIG. 4 shows a perspective view of an example of an insert according to the invention in the form of a pan with a conical shape on the bottom side.

FIG. 4 shows a perspective illustration of an example of the insert 10 arranged as a conical bottom in a pan-like structure 48 as a part of an apparatus for preparing food by circulation of hot air. In other words, the pan 48 provides a part of the enclosing surfaces for the food preparation chamber. As can be seen in the perspective top view, the insert 10 is arranged as a conical bottom structure, upon which a food basket (not further shown) can be arranged such that the inclination of the insert 10 extends beyond a vertical projection of the food basket. A support rest 50 is indicated, upon which support rest 50 the food basket can be placed such that a gap between the food basket and the insert is provided to allow circulation of hot air.

In FIG. 4, lines 49 are shown in order to indicate the conical shape. It must be noted that these lines do not necessarily represent structural features on the inclined surface.

It is noted that the term "insert" relates to separate inserts that can be provided on an existing surface, but the term also relates to bottom surfaces provided with the particular inclination, i.e. an insert can be provided integrally with a bottom surface of a pan or other enclosing structure.

In an example, the pan itself provides the insert with the inclination. For example, FIG. 4 shows a pan manufactured so as to have the conical shape, as an example for the inclination. In another example, not shown, the insert is provided as a separate conical insert.

Figure 5A:
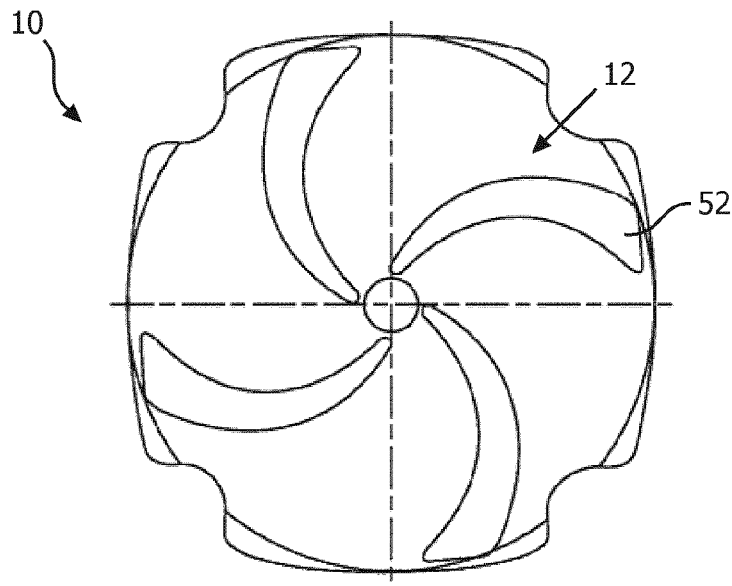
FIG. 5 shows a further example of an insert according to the invention in a schematic top view in FIG. 5A, and a perspective drawing in FIG. 5B, and in combination with an air guide member in FIG. 5C.
Figure 5B:
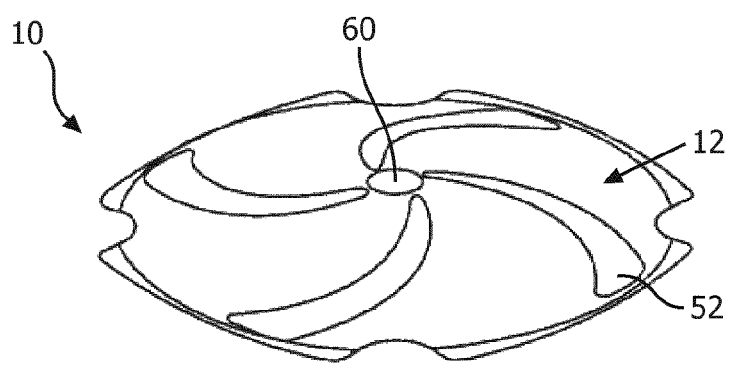
Figure 5C:
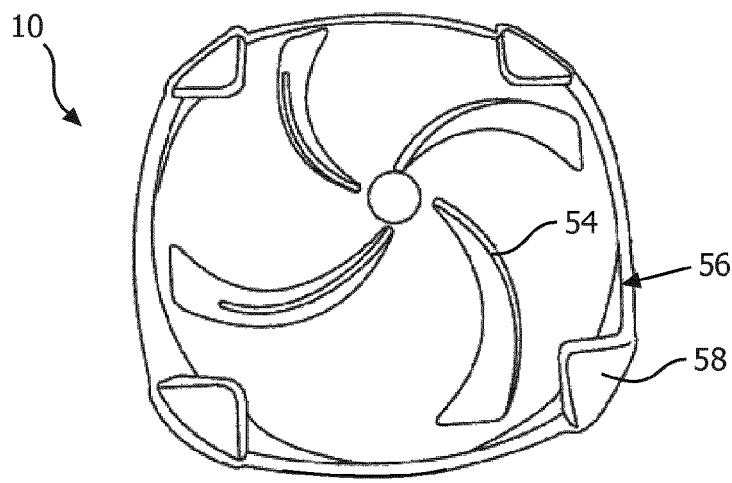

FIG. 5 shows a further example of the insert 10, in a schematic top view in FIG. 5A, and a perspective view in FIG. 5B, and in combination with an air guide member in FIG. 5C. The upper surface 12 comprises a plurality of openings 52 adapted to receive upwardly extending ribs 54 (only shown in FIG. 5C) of an air guide member 56 placed below the insert. For example, the insert is still conical-shaped and has no ribs itself. The openings 52 are created in the upper surface 12 such that the openings 52 can cooperate and receive the ribs of a starfish-shaped air guide member placed below the insert, as illustrated in FIG. 5C. It is further noted that FIG. 5C also shows food basket support corners 58. The insert 10 is used to partially cover the air guide member, for example a starfish-shaped air guide member, by defining a pseudo-conical shape.

In an example, also indicated in FIG. 5 as an option, the openings 52 are spiral-shaped and converge in the direction of a middle zone 60.

In an example, the openings are provided to receive ribs that are arranged in such a starfish-pattern.

In an example, the insert is especially applicable for food comprising excessive moisture or oil. In an example, e.g. for such food, a cone is provided to advantageously cover the starfish. In another example, the insert with the openings is temporarily replaced.

In an example, the apparatus is provided with different inserts, e.g. inserts with different air guides, different cone angles, different gaps and/or with other different insert parameters.

According to a further example, not further shown, in addition to the inclination, the upper surface 12 is provided with a plurality of upwardly extending ribs forming an air guide. For example, the ribs are spiral-shaped and converge in the direction of the middle zone.

In an example, not further shown, air guiding ribs are arranged in a starfish pattern, extending upward from the upper surface. In a further example, the air guiding ribs are arranged as radial ribs, each having a spiral-shaped longitudinal extension from a middle region of the upper surface towards the edges. Preferably, the ribs' degree of extension from the upper surface increases in the downward direction of the inclined surface.

Figure 6:
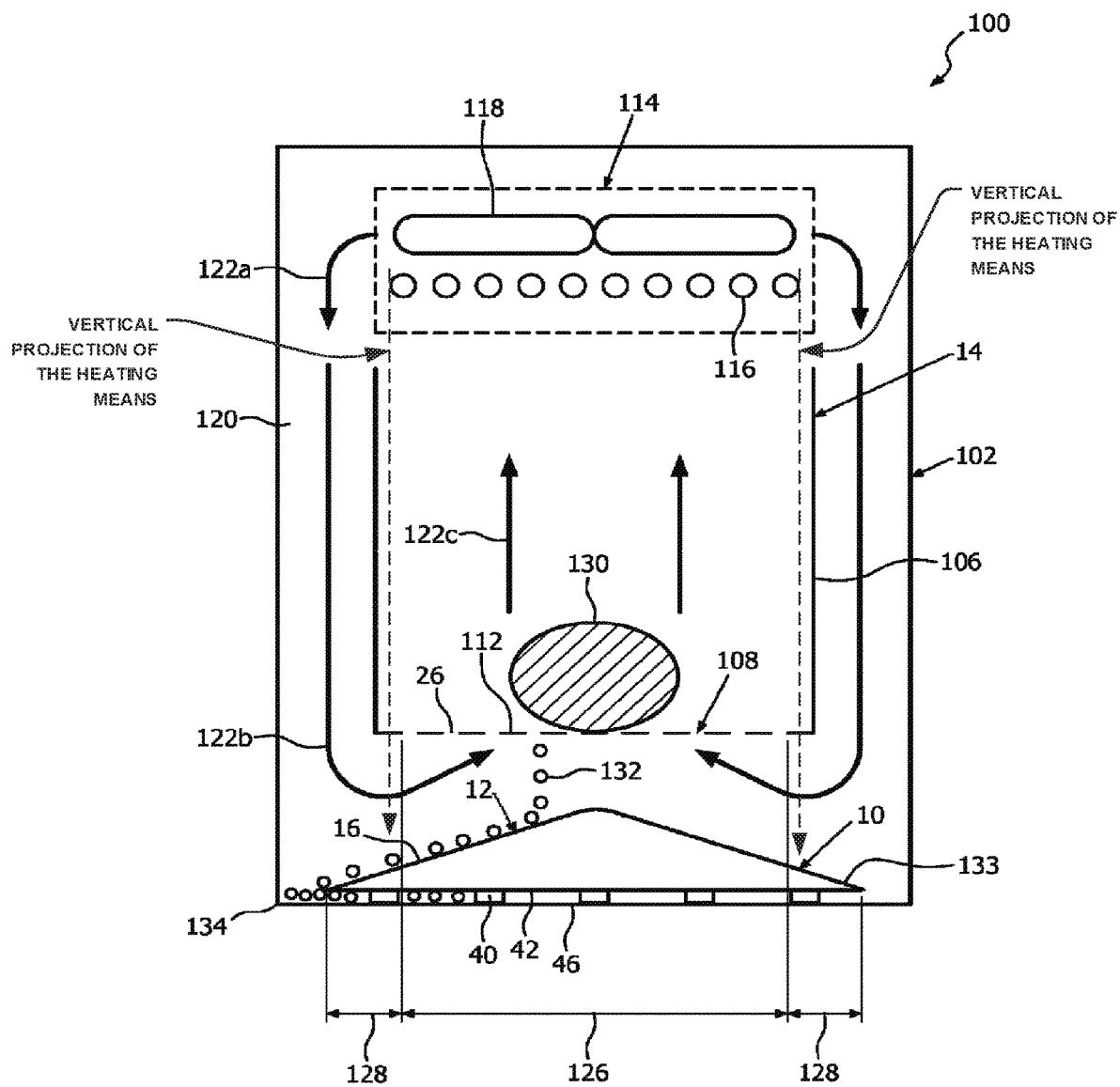
FIG. 6 shows a schematic cross-section through an example of an apparatus according to the invention for preparing food by circulation of hot air.

FIG. 6 shows an example of an apparatus 100 for preparing food by circulation of hot air according to the invention. The apparatus 100 comprises a food preparation chamber 102, schematically indicated as a sort of enclosing structure. Further, a food basket 14 is placed inside the food preparation chamber 102. The food basket is provided with a bottom part 108 with a lower opening area 26 comprising (a plurality of) openings 112 for the circulation of hot air (for example made by a meshed structure). Further, a system 114 for generating a flow of hot air is provided that comprises heating means 116 and ventilation means 118. Still further, optionally, air guide means 120 are provided to guide the flow of hot air towards the bottom part of the food basket. For example, the air guide means 120 are provided as a lateral gap between the enclosing surface of the food preparation chamber 102 and side-walls 106 of the food basket 14.

Circulation of hot air is indicated with airflow arrows 122a, 122b, and 122c to indicate the flow of hot air.

In another example, not further shown, the airflow is oppositely directed, i.e. with an opposite flow direction with respect to the indicated example in FIG. 6.

Further, an insert 10 according to the invention is provided according to one of the above-mentioned examples, wherein the insert 10 is placed below the bottom part 108 of the food basket 14.

The inclined surface of the insert 10 is provided with an inclination such that it extends at least beyond a vertical projection of the lower opening area. In FIG. 6, a double arrow 126 indicates the lower opening area and the extension thereof when projected downwards onto the insert 10, while the two double arrows 128 indicate the extension of the inclination beyond this vertical projection of the lower opening area.

For example, an item of food 130 is provided on the bottom part 108 on top of the lower opening area 26. Small droplets 132 indicate residual material (e.g. fat or water) that drips down from the food 130. Due to the inclination, such droplets are transferred to side regions, for example to a side area 134 where residual material accumulates. In turn, the residual material flows below the insert 10, thanks to the spacers 40. Since the area below the insert 10 has a reduced temperature because the inclined surface 16 shields it from the heat from the heating element 116 and the flow of hot air, the residual material in this area does not evaporate, in particular it does not evaporate in the direction of the heating element (which would cause smoke), and keeps it enclosed in this area below the insert. Thus, smoke generation is minimized.

In an example, the food basket is provided as a basket-like structure. The food preparation chamber may be provided by a pan, as indicated by the food preparation chamber outline 102.

In an example, the apparatus is a household appliance. For example, the apparatus is a portable apparatus for use in a household kitchen environment.

In an example, the insert is removable, so that the apparatus and the insert are easier to clean. For example, the insert can be put into a dishwasher.

In an example, as indicated in FIG. 6, the inclined upper surface of the insert extends beyond the vertical projection of the side walls of the food basket.

According to a further example, also shown as an option in FIG. 6, the heating means 116 are provided in an upper part of the food preparation chamber 102 and the inclined upper surface of the insert 10 extends at least beyond a vertical projection of the heating means.

In an example, the heating means are provided above the food basket, or at least in an upper region of the food basket.

In a further example, the heating means are provided across a heating area that is smaller than the opening area. Hence, the inclination extends beyond the heating area, but maybe it does not extend beyond the opening area.

According to an example, for example shown as an option in FIG. 6, the insert 10 is provided with a collecting portion 133 at an outer edge of the inclined surface. The collecting portion 133 is arranged at least outside the vertical projection of the lower opening area.

In an example, the collecting portion is arranged outside the vertical projection of the area with the plurality of openings, and/or outside the vertical projection of the heating means, and/or outside the vertical projection of the side walls.

According to a further example, the insert is freely detachable from the apparatus.

In an example, the insert is provided as an additional insert to upgrade an existing apparatus.

In another example, the insert is fixedly provided as lower surface of an air guiding volume.

In an example, the insert forms a lower enclosing segment of the food preparation chamber.

In an example, an air ventilation enclosure is provided by a housing structure, in which air ventilation enclosure a hot air flow is provided. In the air ventilation enclosure, the food basket is arranged. The insert forms a lower enclosing segment of the air ventilation enclosure.

In a further example, the insert is provided as a pan with a conical bottom structure. As indicated in FIG. 4, a small flat surface may be provided on the bottom, for example if needed for any other purpose, such as a small flat circular top, visible in FIG. 4, for supporting a mesh-like structure of the food basket arranged atop thereof.

In a further example, the insert is provided as an adapter that fits on top of a pre-existing surface, which itself would not be suitable to prevent smoke.

In an example, the invention is used for a system with another airflow direction, for example from the top through the basket to the bottom.

It has to be noted that embodiments of the invention are described with reference to different subject matters. In particular, some embodiments are described with reference to an insert whereas other embodiments are described with reference to the apparatus. However, a person skilled in the art will gather from the above that, unless otherwise notified, in addition to any combination of features belonging to one subject matter also any combination between features relating to different subject matters is considered to be disclosed with this application. However, all features can be combined providing synergistic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfill the functions of several items re-cited in the claims. The mere fact that certain measures are recited in mutually different dependent claims does not indicate that a combination of these measures cannot be used to advantage. Any reference signs in the claims should not be construed as limiting the scope.

The invention claimed is:

1. An insert for an apparatus for preparing food by circulation of a flow of hot air in a food basket placed inside a food preparation chamber, the food basket having a bottom part with a lower opening area for the circulation of said flow of hot air between the food basket and the food preparation chamber, the insert being positionable in the food preparation chamber, the insert comprising;
   an upper surface intended to be arranged below the food basket within the food preparation chamber, wherein the upper surface defines an inclined surface having a downward inclination extending outwards from a middle zone of the upper surface towards a perimeter of the insert, and wherein the inclined surface is provided such that the downward inclination extends at least beyond a vertical projection of said lower opening area from the middle zone of the upper surface to the perimeter of the insert;
   a lower side of the insert;
   spacers provided on the lower side of the insert, wherein the spacers are configured to create a clearance gap between (i)said lower side of the insert and (ii) a bottom surface of said food preparation chamber, wherein the perimeter of the insert is spaced away from an inner wall of the food preparation chamber at a side area to allow droplets of residual materials originating from an item of food in the food basket being prepared via circulation of the flow of hot air to pass over the inclined surface, into the side area and the clearance gap, and onto the bottom surface of the food preparation chamber; and
   wherein the upper surface comprises a plurality of openings adapted to receive upwardly extending ribs of an air guide member placed below the insert.

2. The insert according to claim 1, wherein the inclined surface is provided such that the downward inclination extends beyond a vertical projection of side walls of the food basket.

3. The insert according to claim 1, wherein the downward inclination continuously extends downward from the middle zone to the perimeter of the insert.

4. The insert according to claim 1, wherein the upper surface is provided as a conical structure.

5. The insert according to claim 1, wherein the plurality of openings are spiral-shaped and converge in the direction of the middle zone.

6. The insert according to claim 1, wherein the upwardly extending ribs are spiral-shaped and converge in the direction of the middle zone.

7. An apparatus for preparing food by circulation of a flow of hot air, comprising: a food preparation chamber;
   a food basket placed inside the food preparation chamber and having a bottom part with a lower opening area for the circulation of said flow of hot air;
   a system for generating said flow of hot air with a heating source and an air source;
   a lateral gap to guide the flow of hot air towards the bottom part of the food basket; and
   an insert according to claim 1, placed below said bottom part.

8. The apparatus according to claim 7, wherein the upper surface extends beyond a vertical projection of side walls of the food basket.

9. The apparatus according to claim 7, wherein the heating source is provided in an upper part of the food preparation chamber, and wherein the upper surface extends at least beyond a vertical projection of the heating source.

10. The apparatus according to claim 7, wherein the insert is provided with a collecting portion at an outer edge of the inclined surface, and wherein the collecting portion is arranged at least outside the vertical projection of the lower opening area.

11. The apparatus according to claim 7, wherein the insert is detachable from the apparatus.

12. An insert for an apparatus for preparing food by circulation of a flow of hot air in a food basket placed inside a food preparation chamber, the food basket having a bottom part with a lower opening area for the circulation of said flow of hot air between the food basket and the food preparation chamber, the insert being positionable in the food preparation chamber, the insert comprising: an upper surface intended to be arranged below the food basket within the food preparation chamber, wherein the upper surface comprises a conical structure having an inclined surface with a downward inclination extending outwards from a middle zone of the upper surface towards a perimeter of the insert, wherein the downward inclination extends at least beyond a vertical projection of said lower opening area from the middle zone of the upper surface to the perimeter of the insert; a lower side of the insert;

spacers on the lower side of the insert, wherein the spacers create a clearance gap between (i) said lower side of the insert and (ii) a bottom surface of said food preparation chamber, wherein the perimeter of the insert is spaced away from an inner wall of the food preparation chamber at a side area to allow droplets of residual materials originating from an item of food in the food basket being prepared via circulation of the flow of hot air to pass over the inclined surface, into the side area and the clearance gap, and onto the bottom surface of the food preparation chamber; and wherein the upper surface comprises a plurality of openings adapted to receive upwardly extending ribs of an air guide member placed below the insert.

13. The insert according to claim 12, wherein the inclined surface is provided such that the downward inclination extends beyond a vertical projection of side walls of the food basket.

14. The insert according to claim 12, wherein the downward inclination continuously extends downward from the middle zone to the perimeter of the insert.

15. The insert according to claim 12, wherein the plurality of openings are spiral-shaped and converge in the direction of the middle zone.

16. The insert according to claim 12, wherein the upwardly extending ribs are spiral-shaped and converge in the direction of the middle zone.

* * * * *